(12) United States Patent
Peck et al.

(10) Patent No.: US 11,099,525 B2
(45) Date of Patent: Aug. 24, 2021

(54) CONTROL OF SAFETY INPUT/OUTPUT BY NON-SAFETY SYSTEM DURING SAFE TIMES

(71) Applicant: NATIONAL INSTRUMENTS CORPORATION, Austin, TX (US)

(72) Inventors: Joseph E. Peck, Hutto, TX (US); Jeffrey J. Kellam, Austin, TX (US); Michelle C. Denny, Austin, TX (US)

(73) Assignee: National Instruments Corporation, Austin, TX (US)

( * ) Notice: Subject to any disclaimer, the term of this patent is extended or adjusted under 35 U.S.C. 154(b) by 208 days.

(21) Appl. No.: 15/372,649

(22) Filed: Dec. 8, 2016

(65) Prior Publication Data
US 2018/0164752 A1    Jun. 14, 2018

(51) Int. Cl.
*G05B 9/02* (2006.01)
(52) U.S. Cl.
CPC ..................................... *G05B 9/02* (2013.01)
(58) Field of Classification Search
CPC ......................................................... G05B 9/02
USPC ........................................................... 700/20
See application file for complete search history.

(56) References Cited

U.S. PATENT DOCUMENTS

| | | | |
|---|---|---|---|
| 8,560,094 B2 | 10/2013 | Ehrhart | |
| 8,595,827 B2 | 11/2013 | Zondler | |
| 8,706,265 B2 | 4/2014 | Taira | |
| 8,880,201 B2 | 11/2014 | Taira | |
| 9,841,736 B2 | 12/2017 | Grgic | |
| 10,133,251 B2 | 11/2018 | Furrer | |
| 2006/0266966 A1* | 11/2006 | Karte | ...................... F16K 17/04 251/129.04 |
| 2010/0036542 A1* | 2/2010 | Karte | ....................... G05B 9/02 700/302 |

(Continued)

FOREIGN PATENT DOCUMENTS

DE    102005024686 A1 * 12/2006    ......... F16K 37/0083

*Primary Examiner* — Kenneth M Lo
*Assistant Examiner* — Michael W Choi
(74) *Attorney, Agent, or Firm* — Kowert, Hood, Munyon, Rankin & Goetzel P.C.; Jeffrey C. Hood

(57) ABSTRACT

Improved process control systems may include shared safety control and process control components/elements, facilitating the sharing of sensors, actuators, and input/output (I/O) interface circuitry between the safety functionality of the system and the general operational (i.e. normal) functionality of the system. Components and/or circuitry corresponding to safety operations of the system may be designed to permit inputs to be monitored during normal operations at all times as there is typically no safety risk associated with monitoring. The components and/or circuitry corresponding (or dedicated) to the safety operations of the system may operate to prevent normal operational control of various designated outputs/actuators when there is a need to activate safety functions. When there is no need to activate safety functions, these same components and/or circuitry may allow normal operational control of the designated outputs/actuators. The safety portion or segment of the system may have priority control over the outputs/actuators, and may permit normal functionality and signal propagation to the actuators/outputs when it is safe to do so.

18 Claims, 6 Drawing Sheets

(56) References Cited

U.S. PATENT DOCUMENTS

2010/0164423 A1* 7/2010 Nakayama ......... G05B 19/0425
318/565
2017/0123396 A1* 5/2017 Papenbreer .......... G05B 19/048

* cited by examiner

CONTROL OF SAFETY INPUT/OUTPUT BY NON-SAFETY SYSTEM DURING SAFE TIMES

FIELD OF THE INVENTION

The present invention relates to the field of instrumentation, and more particularly to the design of control of safety input/output by a non-safety system during safe times.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation. The instrumentation hardware may be configured and controlled by software executing on a host computer system coupled to the system, or by a controller card installed in the chassis. The software for configuring and controlling the instrumentation system typically includes driver software and the instrumentation application software, or the application.

It is becoming increasingly common for control, measurement, and automation applications and systems to include safety requirements in addition to their normal functionality. These safety requirements are traditionally implemented as an independent safety system consisting of sensors, actuators, and a controller designed and certified for use as safety elements. A safety system traditionally includes extensive diagnostic capabilities for the detection and mitigation of faults that can result in dangerous failures. These diagnostics may detect internal failures (such as memory corruption, damaged buffers, etc.) as well as user level failures (broken wire detection, short circuit protection and reporting, etc.). Consequently, safety requirements implemented as independent safety systems can add cost, consume more power, take up more space, and contribute to system complexity.

Other corresponding issues related to the prior art will become apparent to one skilled in the art after comparing such prior art with the present invention as described herein.

SUMMARY OF THE INVENTION

Various embodiments of systems disclosed herein include merged safety control and process control components/elements, facilitating the sharing of sensors, actuators, and input/output (I/O) interface circuitry between the safety functionality of the system and the general operational (i.e. normal) functionality of the system. Components and/or circuitry corresponding to safety operations of the system may be designed to permit inputs to be monitored during normal operations at all times as there is typically no safety risk associated with monitoring. In contrast, these components and/or circuitry corresponding (or dedicated) to the safety operations of the system may not permit normal operational control of various designated outputs when there is a call or need to activate safety functions. When there is no call to activate any safety functions, these same components and/or circuitry may allow normal operational control of the designated outputs. The safety portion or segment of the system may therefore have priority control over the outputs, and may permit normal functionality and signal propagation to the outputs when it is safe to do so.

Accordingly, in one set of embodiments a hybrid process and safety control system may include a process controller that selectively accesses and controls of one or more outputs that control one or more components of the system that perform at least part of a normal operating function of the system. The system may also include a safety controller acting as a "gatekeeper" to determine whether it is safe for the process controller to access and control the one or more outputs. The safety controller may provide the process controller access to the one or more outputs if the safety controller has determined that it is safe for the process controller to access and control the one or more outputs. On the other hand, the safety controller may deny the process controller access to the one or more outputs if the safety controller has determined that it is not safe for the process controller to access and control the one or more outputs.

In some embodiments, the safety controller may also access and control the one or more outputs at least in response to determining that it is not safe for the process controller to access and control the one or more outputs, and by doing so it may override the normal operating function of the system and may also cause the one or more components to perform at least part of a safety function of the system. The safety controller may perform system wide monitoring, which may include monitoring at least one or more or all components/elements of the safety controller and/or or process controller, one or more or all of the operational components of the system, e.g. components that are being controlled, and/or one or more sensors that perform at least part of the normal operating function of the system, and determine whether it is safe for the process controller to access and control the one or more outputs based at least on results from the monitoring. The safety controller may also deny the process controller access to the one or more outputs at least in response to one or more safety triggers being activated, or one or more safety inputs—also monitored by the safety controller—being activated. The safety controller may further access and control additional one or more outputs that control additional one or more components of the system that perform at least part of a safety function of the system. In some embodiments, the process controller may transmit a request to the safety controller indicate to the safety controller that the process controller is requesting access to the one or more outputs for controlling the one or more components. The safety controller may determine whether to grant the access according to at least the various conditions and actions described above.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

Figure 1:
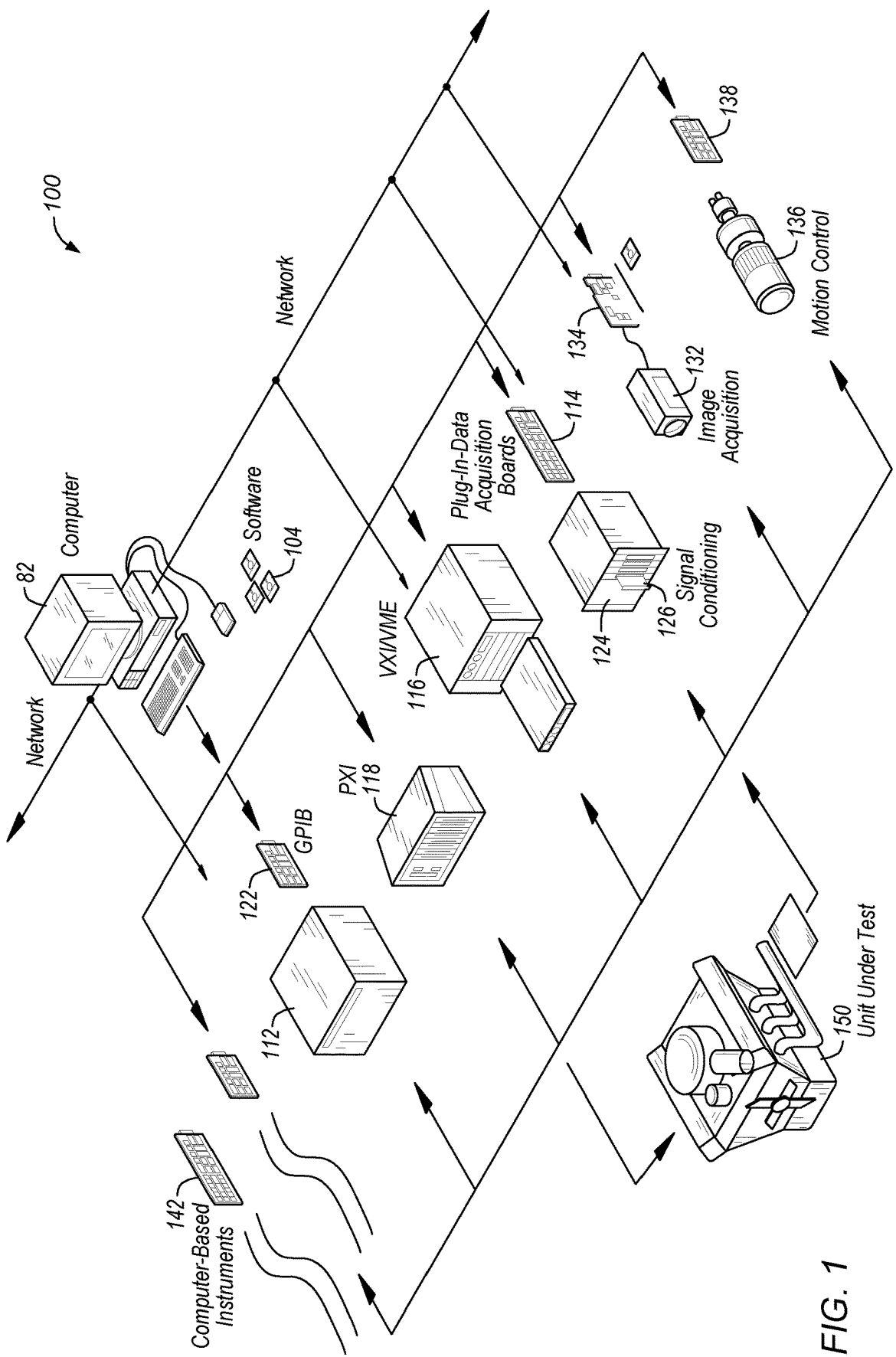
FIG. 1 shows an instrumentation control system with instruments networked together according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Embodiments of improved safety monitoring described herein may be used in systems configured to perform test and/or measurement functions, to control and/or model instrumentation or industrial automation hardware, or to perform, model and/or simulate functions, e.g., modeling or simulating a device or product being developed or tested, etc. More specifically, in various instances where safety monitoring is required, various components or portions of the components present in (or which are part of) the system, e.g. sensors, actuators, and/or I/O interface circuitry to name a few, may be shared between the safety functionality and normal operating functionality of the system, providing flexibility of use, decreased number of components, and reduced power consumption. However, it is noted that various embodiments may equally be used for a variety of other applications, and such applications are not intended to be limited to those enumerated above. In other words, applications discussed in the present description are exemplary only, and various embodiments of systems that include shared safety and operational components may be used in any of various types of systems.

FIG. 1 illustrates an exemplary instrumentation control system 100 which may be configured according to embodiments of the present invention. System 100 comprises a host computer 82 which may couple to one or more instruments configured to perform a variety of functions according to various embodiments of the present invention. Host computer 82 may comprise a CPU, a display screen, memory, and one or more input devices such as a mouse or keyboard as shown. Computer 82 may operate with one or more instruments to analyze, measure, or control a unit under test (UUT) or process 150. The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the unit under test (UUT) or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
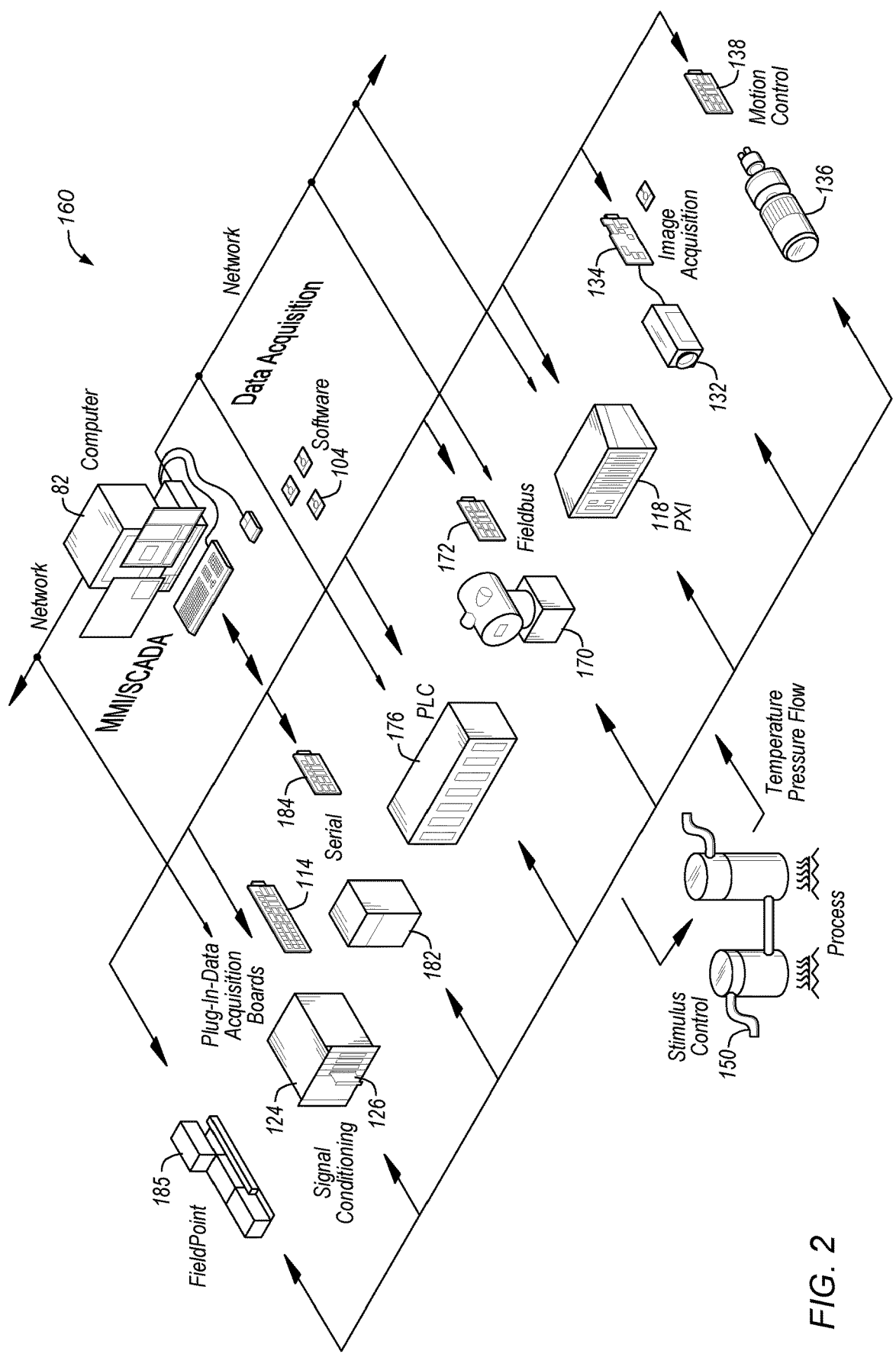
FIG. 2 shows an industrial automation system with instruments networked together according to some embodiments.

FIG. 2 illustrates an exemplary industrial automation system 160 that may be configured according to embodiments of the present invention. Industrial automation system 160 may be similar to instrumentation or test and measurement system 100 shown in FIG. 2. Elements that are similar or identical to elements in FIG. 1 have the same reference numerals for convenience. System 160 may comprise a computer 82 which may couple to one or more systems, devices and/or instruments configured to perform a variety of functions using shared safety and operational components implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection.

Control of Safety I/O

One or more of the devices and instruments or subsystems shown in FIGS. 1 and 2 may include shared safety and operational components. In order to appreciate the differences between various embodiments disclosed herein and previous process control systems that include an independent safety system, an exemplary system diagram of a representative process control system is shown in FIG. 3, and an exemplary system diagram of a representative process control system with an independent safety system is shown in FIG. 4.

Figure 3:
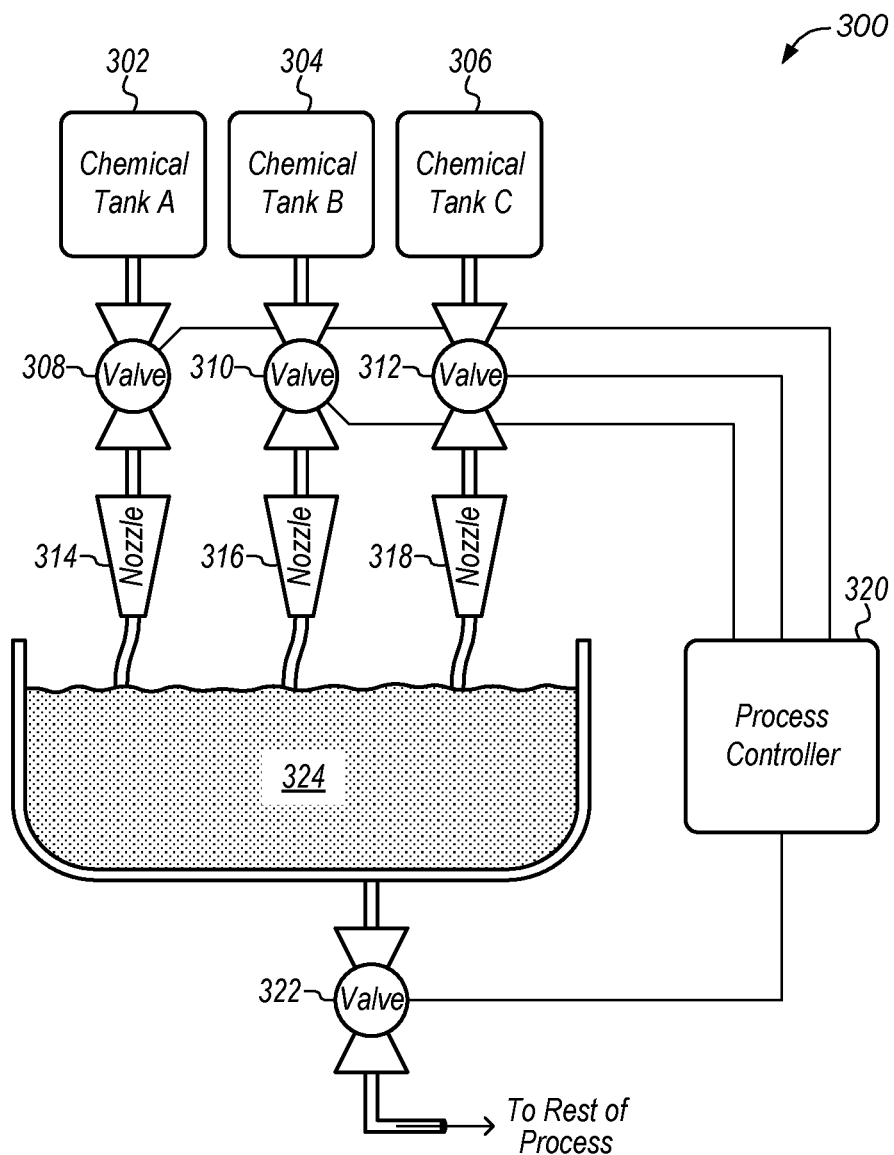
FIG. 3 shows an exemplary system diagram of a representative process control system, according to prior art.

Representative Process Control System—FIG. 3

A representative process control system 300 is shown in FIG. 3. In the specific exemplary application shown in FIG. 3, chemicals are being mixed together in precise ratios. The chemicals from the different tanks (302, 304, and 306) are administered via respective corresponding valves (308, 310, and 312) and nozzles (314, 316, and 328), and are allowed to react for a specific period of time in container 324. The chemical mix is then sent on for further processing from container 324 via valve 322. As mentioned above, each chemical is stored in its own tank (302, 310, and 312), and when the respective ball valve (308, 310, 312) below its corresponding tank is opened, the chemical flows through the corresponding nozzle (314, 316, 318) and mix with any other chemicals already in the vat/container 324. The opening and closing of the ball valve (308, 310, 312) is dictated by the process controller 320, which may implement a complex algorithm for the overall timing of the three chemical tank valves (308, 310, 312) in order to achieve a proper mixture. Once the chemicals are suitably dispensed and the reaction time has passed, the process controller 320 opens the drain valve 322 to transfer the mixture to the rest of the system. The drain valve 322 is then closed and the process is ready to be restarted.

Figure 4:
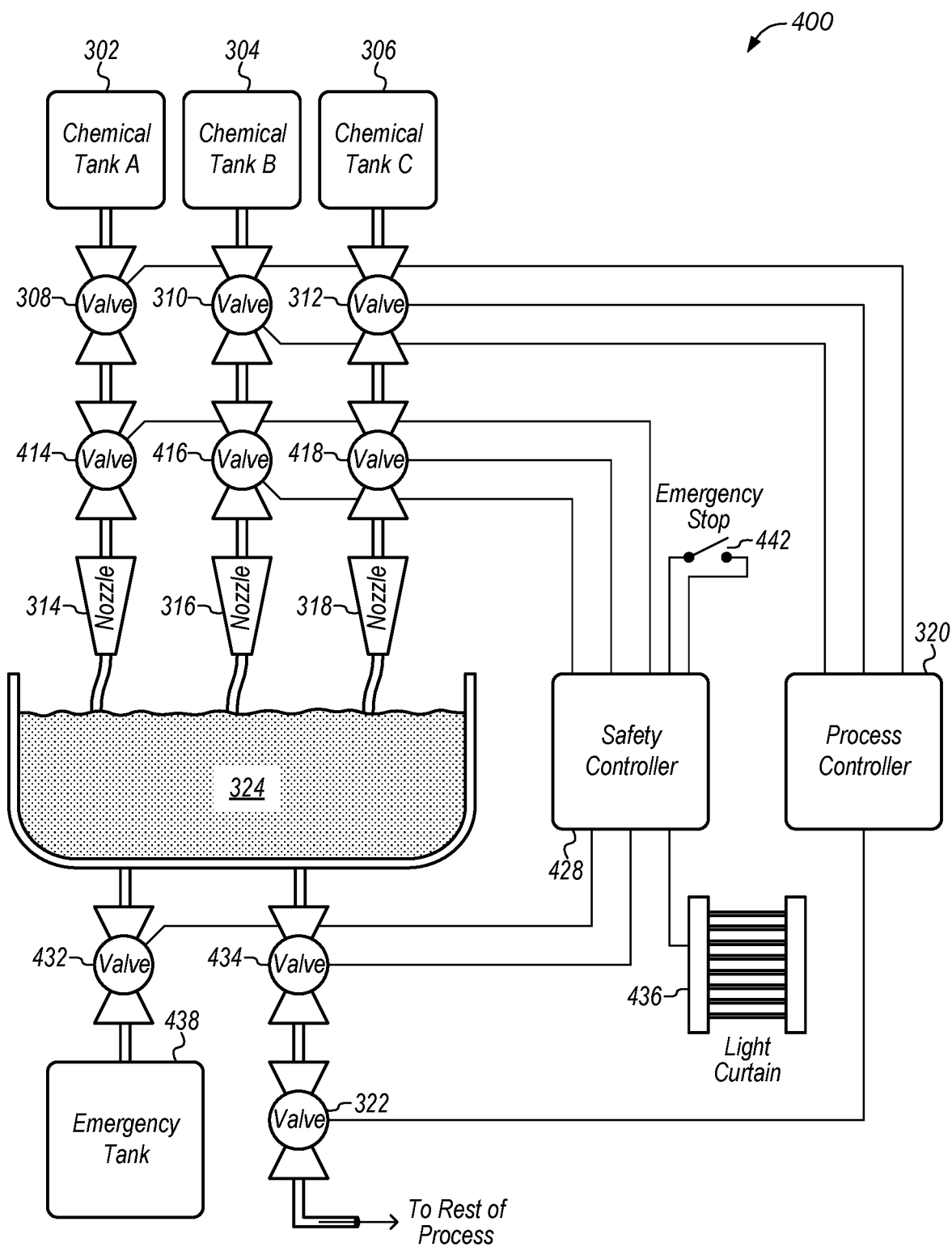
FIG. 4 shows an exemplary system diagram of a representative process control system with an independent safety system, according to prior art.

Representative Process Control System with Independent Safety System—FIG. 4

It is not uncommon for applications such as the one shown in FIG. 3, especially when the chemicals involved in the process are caustic or otherwise dangerous, to incorporate some form of protection for the human operators. This is traditionally implemented as a separate safety system as shown in system 400 in FIG. 4. At a high level, a safety system includes safety sensors, safety actuators, and a safety controller. The safety controller 428 monitors the inputs, and if a dangerous condition is detected it activates the safety function and the outputs are driven to the defined safe state. In the system 400, the safety controller 428 may monitor sensors on valves 414, 416, 418, 432, and 434, which are part of the safety system. For the application shown in FIG. 4, there are two safety inputs, a light curtain 436 and an emergency stop button 442. The light curtain 436 is used to detect if someone is approaching the vat 324, and if so, safety controller 428 may automatically activate the safety function. The emergency stop button 442 is prominently located such that if a nearby operator detects a problem, the operator can manually initiate the safety function. The safety function may include any number of possible courses of action. For example, the safety function, when activated, may lead to one or more of the following: disabling the dispensing of chemicals from the individual tanks 302, 304, and 306 by turning off the safety valves 414, 416, and/or 418; not allowing any chemicals to flow from the vat 324 to the rest of the process by turning off safety valve 434; and/or opening the safety valve 432 to the emergency tank 438 to dump the contents of the vat 324 into a safe enclosure.

The primary benefit of an independent safety system is the clear separation of safety and non-safety functionality, allowing for a more straightforward analysis of the safety system and ease of certification (if required). However, the benefits of such an independent safety system come at a price due to the addition of safety specific sensors, actuators, wiring, and other implementation complexities. Many of these safety components are redundant to the components already present in the process control system, and are capable of the same type of functionality. One approach to reducing the negative impact that a completely independent safety system may have on the process control system is to completely merge the safety and non-safety functions into a single system controller. This presents some immediate component savings, as the safety and process controllers get merged into a single controller and many of the redundant sensors, actuators, and wiring may be eliminated. For applications that have simple process control requirements, such a solution may prove effective, but a merged system might not necessarily scale well with increasing process control complexity. In a merged system, the entire application is expected to be designed and implemented in accordance with the safety standards as there is no longer a clear delineation between the safety and non-safety portions/functions of the system. The cost and effort of implementing and analyzing a merged design even of moderate complexity can quickly outweigh the component savings.

Figure 5:
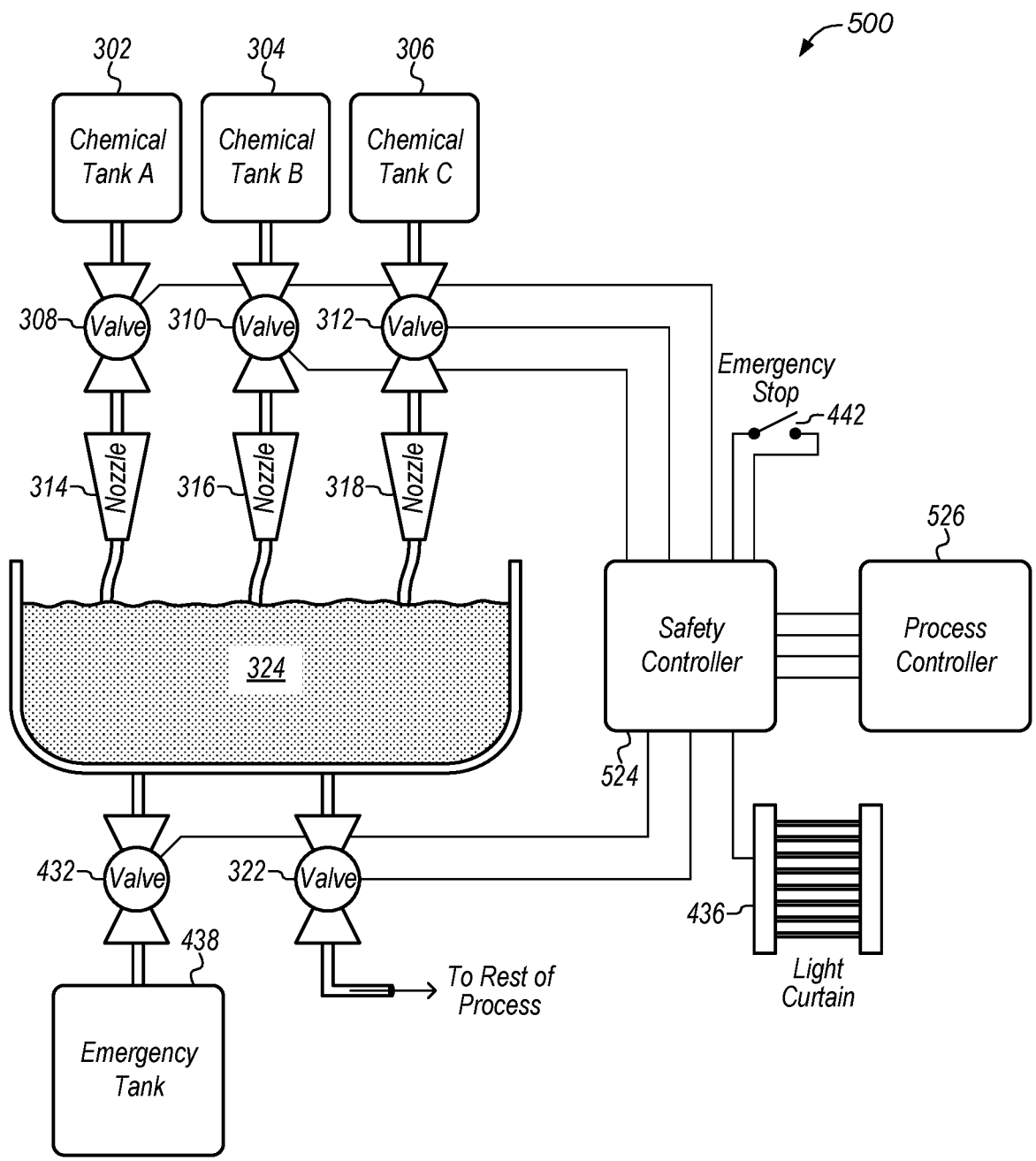
FIG. 5 shows an exemplary system diagram of a representative system in which the process control acts through the safety system, according to some embodiments.

Improved System with Merged Safety and Operational Components—FIG. 5

Pursuant to the above, an improved control system may include partially merged safety and non-safety portions of the system, allowing for the minimization of sensor, actuator, wiring, and interface costs while keeping the complex algorithms that may be associated with process control isolated from the safety function. It should be noted that for ease of understanding, as used herein, "process control" refers to the control of a process or primary system functionality of a system as exemplified in FIG. 3, for example. On the other hand, "Safety control" refers to the implementation and application of safety functions or functionality that ensures safe operation of the system which is under process control. The respective functionality and components that are part of the process control and the safety control are identified accordingly. For example, in the exemplary system 400 shown in FIG. 4, safety valves 414, 416, 418, 432, and 434, as safety controller 428, emergency stop 442, emergency tank 438 and light curtain 436 are part or portions of the safety control, whereas all other remaining components/elements are part or portions of the process control. In various improved embodiments disclosed herein, some components/elements may be used to perform primary system functions/functionality when under process control, as well as perform safety functions/functionality when under safety control, providing substantial advantages over prior art systems.

Partially merging safety and non-safety portions of the system may greatly simplify the validation of the overall system while still allowing for high performance operations that don't present an impact on the safety function, as shown in FIG. 5. In the improved system 500 the safety controller 524 may have direct access to all sensors and actuators for performing the safety function. Meanwhile, the process controller 526 may assert control over the sensors and actuators through the safety controller 524. Thus, in contrast to the system shown in FIG. 4, the safety system in system 500 no longer requires the additional safety valves, sensors and actuators that were present in system 400. Furthermore, safety controller 524 and process controller 526 represent modified and/or different versions of the safety controller 428 and process controller 320 shown in FIG. 4. However, safety system components 438, 436 and 442 are implemented in system 500.

At a high level, the process controller 526 may obtain the state of the sensors at any time, and may operate to control the actuators (e.g. opening/closing valves 308, 310, 318, and 322) when the safety controller 524 determines that it is safe to do so. Thus, safety controller 524 may monitor the system on an ongoing basis to determine when process controller may safely access the various outputs (e.g. to valves 308, 310, and 312 among others). The monitoring may encompass monitoring various system components, including the safety controller 524 and process controller 526 themselves (e.g. performing self-diagnostics, internal diagnostics, power supply checks, watchdog timers, determining internal components failures, etc.). For example, in the chemical mixing example shown in FIG. 5, the safety controller 524 may allow the process controller 526 to turn the various valves on and off (with the exception of the emergency tank valve 432) as long as none of the safety functions have been activated. For example, the safety controller 524 may allow the process controller 526 to assert control over the various valves (308, 310, 312, 318, and 322) if no one has pressed the emergency stop button 442 or crossed the light curtain 436 or the safety controller 524 did not find any faults/failure in any of the system components, including within safety controller 524 and/or within process controller 526). More generally, emergency stop 442 and light curtain 436 are safety components used in generating safety triggers. In other words, a safety trigger may be considered any event that causes the safety controller 524 to remove or revoke control access from process controller 526. For example, if emergency stop 442 is pressed and/or light curtain 436 sends a positive feedback indication to safety controller 524 (e.g. indicating that the light curtain plane has been broken), the safety controller 524 may remove/revoke the access of the process controller 526 to the process control actuators, e.g. access to the valves 308, 310, 312, 318, and 322. Similarly, should safety controller 524 identify any other failure/error within the system, e.g. within safety controller 524 and/or within process controller 526 and or through monitoring sensors/other system components, safety controller 524 may remove or revoke control access from process controller 526. In addition, safety controller 524 may perform any one or more prescribed safety functions in response to the monitoring indicating a caution, fault, error, and/or failure, e.g. closing any of the valves and/or routing the contents of vat 324 via valve 432 to emergency tank 438. The safety controller 524 may not return control of the process control actuators/components (e.g. valves 308, 310, 312, 318, and 322) to the process controller 526 until the appropriate reset action has taken place, and any further valve commands by the process controller 526 may be ignored until access for process controller 526 to the actuators has been reestablished by safety controller 524.

Partial merging of components of the process control system and the safety control system limits the safety validation to demonstrating that the safety controller 524 correctly ignores the process controller 526 when the safety function is activated, e.g. through one or more safety triggers as discussed above. No matter how complex the process control may be (e.g. mixing schedules of the chemicals, low level timing control of turning the valves on and off, etc.), the complexity of the process control remains independent of the safety controller 524.

There may be several ways of separating the safety controller 524 from the process controller 526. It should be noted that overall, the safety controller 524 and process controller 526 may be implemented as one or more processing elements, for example in one or more of the devices (e.g. 82, 118, 112, 114, etc.) shown in systems 100 and 200. As used herein, processing element refers to various elements or combinations of elements that are capable of performing a function in a device, e.g. in a controller device or in a computer device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above. Thus, separating safety controller 524 from process controller 526 may refer to separating functionality or functional elements of safety controller 524 from process controller 526 and operating these functional elements/functionality as separate processes, which may however interoperate with each other. Overall, safety controller 524 and process controller 526 may be considered as running individually, while they may also be running simultaneously.

In some embodiments, interoperation of safety controller 524 (e.g. all safety controller functionality) and process controller 526 (e.g. all process control functionality) may be message based, whereby the process controller 526 sends a request to the safety controller 524 which in turn may set the actuator (e.g. in any of the desired valves) to the requested state (e.g. to the state requested by the process controller 526) if it is appropriate, that is, safe to do so. In some embodiments, safety controller 524 may include a multiplexer that drives the actuator output, and when safe to do so switches the multiplexer to an input that is driven by the process controller 526 rather than the safety controller 524. Other techniques are possible and are contemplated, and the different techniques may feature different implementation details and performance characteristics, but in all cases they have are capable of preventing the process controller 526 from negatively impacting the safety function.

Figure 6:
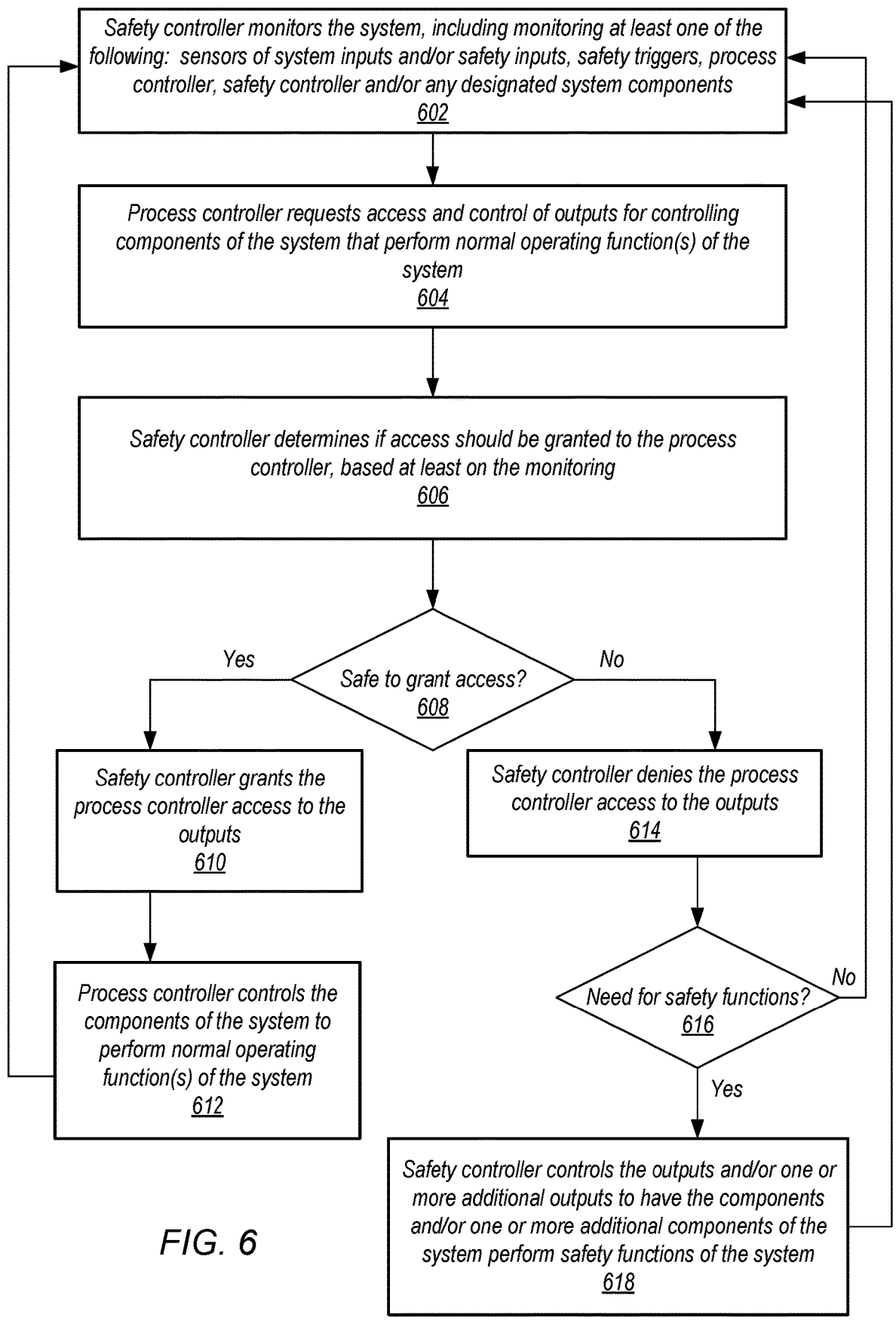
FIG. 6 shows an exemplary flow diagram of a method for safely operating a system, according to some embodiments.

Exemplary Method For Safe Operation of a System—FIG. 6

FIG. 6 shows an exemplary flow diagram of a method for safely operating a system, according to some embodiments. In a system, at least a subset of the components of the system that perform normal operating functions of the system may be accessible to a safety controller as well as to a process controller, and may also be used to perform safety functions of the system as needed. By sharing these components between a process controller (for controlling normal system operations of the system) and a safety controller (for ensuring safe operation of the system), some of the cost and complexity of the system may be reduced. Thus, a safety controller may monitor the system, for example by monitoring respective sensors associated with system inputs as well as with one or more safety inputs and/or safety triggers in the system, monitoring the process controller of the system, monitoring the safety controller of the system, and/or monitoring any one or more additional designated system components (602). For normal operation, the process controller may request access and control of outputs for controlling the components of the system that perform normal operating function(s) of the system (604). The safety controller may determine if access should be granted to the process controller, based at least on the monitoring (606). If the safety controller determines that it is safe to grant the process controller access to the outputs ("Yes" branch taken at 608), it grants the access (610). The process controller may then control the components of the system to perform normal operating functions of the system (612). Meanwhile, the safety controller may continue to monitor the system on an ongoing basis (602).

However, if the safety controller determines that it is not safe to grant the process controller access to the outputs ("No" branch taken at 608), the safety controller denies the process controller access to the outputs (614). Furthermore, if there is a need to perform safety functions ("Yes" branch taken at 616), the safety controller may control the outputs and/or one or more additional outputs to have the corresponding components and/or one or more additional components of the system (corresponding to the one or more additional outputs) perform safety functions of the system (618). If there is no need to perform any safety functions ("No" branch taken at 616), the safety controller may simply continue to monitor the system on an ongoing basis (602). Similarly, the safety controller may continue monitoring the system even as (and/or after) the safety functions (in 618) have been performed (602).

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A hybrid process and safety control system, the system comprising:
   a safety control circuit comprising:
     a plurality of outputs configured to couple to corresponding components of the system that perform one or more normal operating functions of the system; and
     additional one or more outputs configured to couple to additional one or more components of the system that perform only dedicated safety functions of the system; and
   a process control circuit communicatively coupled to the safety control circuit, and configured to send a request to the safety controller to control one or more of the corresponding components according to the request, the request is a message based request;
   wherein the safety control circuit is configured to:
     monitor operation of the safety control circuit and operation of the process control circuit;
     control the one or more of the corresponding components through corresponding one or more outputs of the plurality of outputs according to:
       the request, at least partially in response to results of the monitoring indicating that it is safe to do so; or
       a safety function, at least partially in response to the results of the monitoring indicating that it is not safe to control the one or more of the corresponding components according to the request; and
     control, through the additional one or more outputs of the safety control circuit, the additional one or more components of the system.

2. The system of claim 1, wherein the safety control circuit comprises:
   a multiplexer configured to drive the plurality of outputs, wherein the safety control circuit is configured to control the one or more of the corresponding components according to the request by switching the multiplexer to control the one or more of the corresponding components according to a drive signal of the process control circuit.

3. The system of claim 1, wherein the safety control circuit is further configured to:
   control the one or more of the corresponding components to override the normal operating function of the system and cause the one or more of the corresponding components to perform at least part of the safety function.

4. The system of claim 1, wherein the safety control circuit is further configured to:
   additionally monitor at least one of the following:
     one or more sensors that perform at least part of the normal operating function of the system;
     one or more inputs; or
     one or more designated system components; and
   determine whether it is safe to control the one or more of the corresponding components according to the request further based on results of the additional monitoring.

5. The system of claim 1, wherein the safety control circuit is further configured to:
   control the one or more of the corresponding components according to the safety function at least in response to one or more safety triggers being activated.

6. The system of claim 1, wherein the safety control circuit is configured to:
   receive one or more external safety inputs;
   control the one or more of the corresponding components according to the safety function at least in response to one or more of the one or more external safety inputs being activated.

7. The system of claim 1, wherein the request indicates respective states for actuators used in controlling the one or more of the corresponding components.

8. An apparatus for facilitating combined operational and safety control of a system, the apparatus comprising:
   a plurality of outputs configured to couple to corresponding components of the system that perform at least part of a normal operating function of the system;
   additional one or more outputs configured to couple to additional one or more components of the system that perform only dedicated safety functions of the system;
   a non-transitory memory element storing information; and
   a processing element configured to use at least a portion of the information to:
     execute a first process configured to generate requests to control one or more of the corresponding components, the requests are message based requests; and
     execute a second process, wherein the second process is configured to:
       monitor execution of the first process and execution of the second process;
       selectively access the plurality of outputs to control the corresponding components through the plurality of outputs; and
       control the one or more of the corresponding components through corresponding one or more outputs of the plurality of outputs according to:
         the requests, in response to the second process determining, based at least in part on results of the monitoring; that it is safe to do so; or a safety function, in response to the second process determining that it is not safe control the one or more of the corresponding components according to the requests; and control, through the additional one or more outputs, the additional one or more components.

9. The apparatus of claim 8, wherein the second process is further configured to control the one or more of the corresponding components according to the requests through a multiplexer receiving one or more drive signals generated the first process.

10. The apparatus of claim 9, wherein by controlling the one or more of the corresponding components according to the safety function, the second process overrides the normal operating function of the system and causes the one or more of the corresponding components to perform at least part of the safety function.

11. The apparatus of claim 9, wherein the second process is further configured to:
additionally monitor at least one of the following:
one or more sensors that perform at least part of the normal operating function of the system;
one or more inputs; or
one or more designated system components; and
determine whether it is safe to control the one or more of the corresponding components according to the requests further based on results of the additional monitoring.

12. The apparatus of claim 8, wherein the second process is further configured to:
control the one or more of the corresponding components according to the safety function in response to activation of one or more safety triggers.

13. The apparatus of claim 8, wherein the second process is further configured to:
monitor one or more safety inputs; and
control the one or more of the corresponding components according to the safety function in response to one or more of the one more safety inputs being activated.

14. The apparatus of claim 8, wherein the requests indicate respective states for actuators used in controlling the one or more of the corresponding components.

15. A non-transitory memory medium storing programming instructions for facilitating combined operational and safety control of a system, wherein the programming instructions are executable by a processing element to:
cause a process controller to generate a request to control one or more of a plurality of components of the system that perform at least part of a normal operating function of the system, the request is a message based request; and
cause a safety controller to:
monitor operation of the safety controller and operation of the process controller;
selectively control the plurality of components through one or more corresponding outputs of the safety controller by at least controlling the one or more of the plurality of components according to:
the request, at least partially in response to results of the monitoring indicating that it is safe to do so; or
a safety function, at least partially in response to the results of the monitoring indicating that it is not safe to control the one or more of the plurality of components according to the request; and
control, through additional one or more outputs, additional one or more components of the system that perform only dedicated safety functions of the system.

16. The non-transitory memory medium of claim 15, wherein the programming instructions are executable by the processing element to:
further cause the safety controller to control the one or more of the plurality of components according to the safety function to override the normal operating function of the system and cause the one or more of the plurality of components to perform at least part of the safety function.

17. The non-transitory memory medium of claim 15, wherein the programming instructions are executable by the processing element to further cause the safety controller to:
additionally monitor at least one of the following:
one or more sensors that perform at least part of the normal operating function of the system;
one or more inputs; or
one or more designated system components; and
determine whether it is safe to control the one or more of the plurality of components according to the request further based on results of the additional monitoring.

18. The non-transitory memory medium of claim 15, wherein the programming instructions are executable by the processing element to further cause the safety controller to perform one or more of the following:
control the one or more of the plurality of components according to the safety function in response to one or more of the following:
one or more safety triggers being activated
receiving one or more safety function activation signal.

* * * * *

UNITED STATES PATENT AND TRADEMARK OFFICE
CERTIFICATE OF CORRECTION

PATENT NO. : 11,099,525 B2  
APPLICATION NO. : 15/372649  
DATED : August 24, 2021  
INVENTOR(S) : Joseph E. Peck et al.

Page 1 of 1

It is certified that error appears in the above-identified patent and that said Letters Patent is hereby corrected as shown below:

In the Claims

Claim 8, Column 11, Line 2, please insert -- to -- after "safe" and before "control".

Claim 9, Column 11, Line 11, please insert -- by -- after "generated" and before "the".

Claim 11, Column 11, Line 18, please delete "claim 9" and insert -- claim 8 --.

Claim 18, Column 12, Line 48, please insert -- ; or -- after "activated".

Claim 18, Column 12, Line 49, please delete "signal" and insert -- signals --.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*